UNITED STATES PATENT OFFICE.

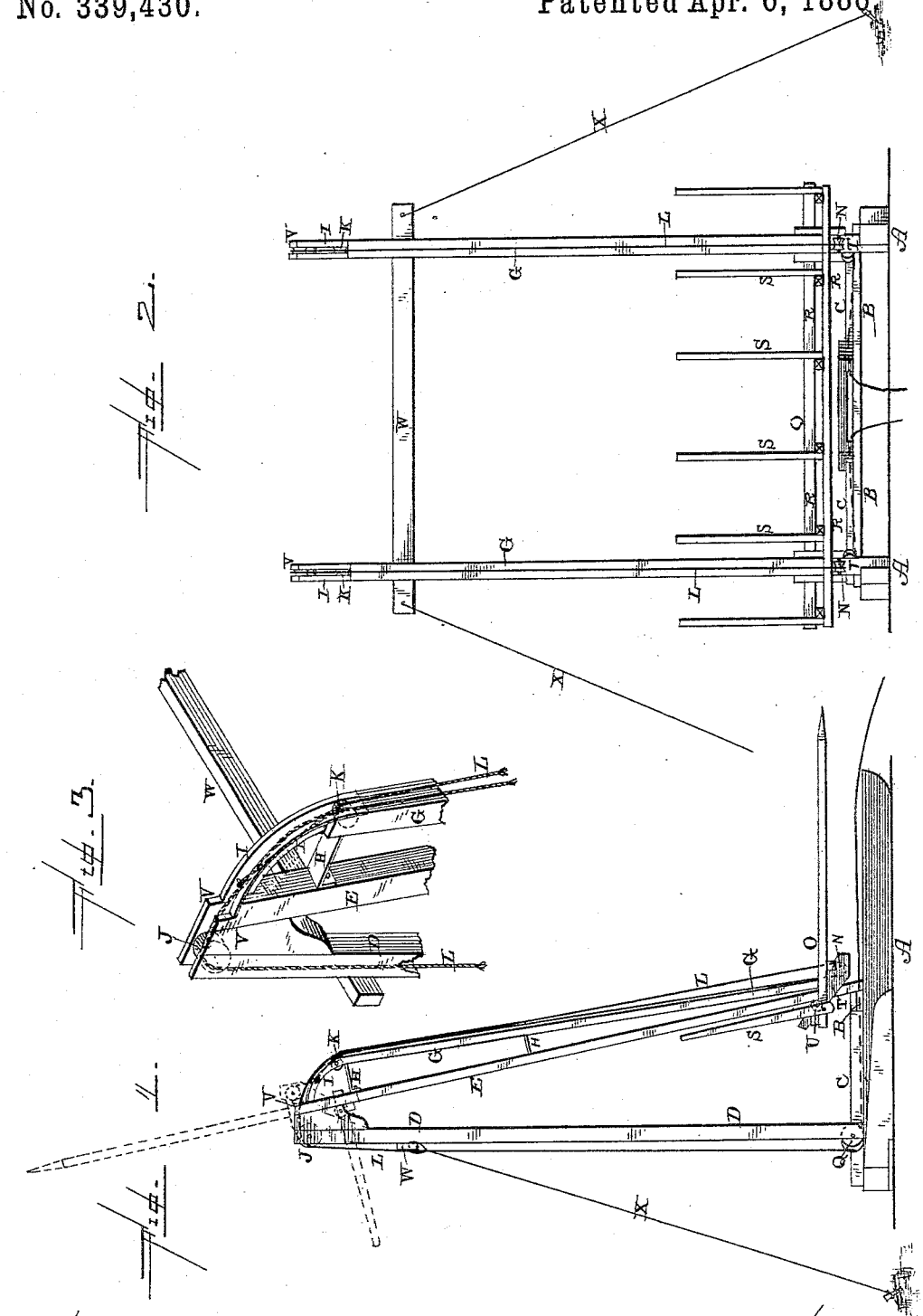

WILLIAM T. KING, OF HOUGHTON, IOWA.

HAY-STACKER.

SPECIFICATION forming part of Letters Patent No. 339,430, dated April 6, 1886.

Application filed November 21, 1885. Serial No. 183,581. (No model.)

*To all whom it may concern:*

Be it known that I, WILLIAM T. KING, of Houghton, in the county of Lee and State of Iowa, have invented certain new and useful Improvements in Hay-Stackers; and I do hereby declare the following to be a full, clear, and exact description of the invention, such as will enable others skilled in the art to which it pertains to make and use it, reference being had to the accompanying drawings, which form part of this specification.

My invention relates to an improvement in hay-stackers; and it consists in, first, the combination of the runners or sills, the standards placed at an angle to each other, the guides placed at an angle to the standards, the curved guides connected to the upper ends of the inclined guides, the hoisting-ropes, the hay-carriage, and the guiding-pulleys; second, the combination of the hay-carriage provided with the pulley-frames and pulleys, the standards placed at an angle to each other, the guides placed at an angle to the standards, curved guides or ways, the pulleys at the top of the frame, hoisting-ropes, and the shoulders, which act as stops, as will be more fully described hereinafter.

The object of my invention is to produce a hay-stacker which will receive the hay direct from the hay rake or slide, raise it upward, and automatically dump it upon the stack by the forward draft of the team.

Figure 1 is a side elevation of a hay-stacker embodying my invention, showing the fork in one position in solid lines and in another position in dotted lines. Fig. 2 is a front view. Fig. 3 is an enlarged perspective of the upper portion of the stacker, one side only being shown.

A represents the runners upon which the stacker is placed, and which can be freely moved from place to place. These runners are connected together by the cross-piece B, which extends from one to the other, and by the two diagonal pieces C, which extend from the runners to the cross-piece, as shown. Rising from the top of the runners at any suitable point are the vertical standards D and the inclined standards E. The inclined standards extend from near the front ends of the runners rearwardly toward the tops of the standards D, and are rigidly secured to them at their tops. These inclined standards E form parts of the guides upon which the hay-rack is raised.

Secured to the inclined standards E at their lower ends are the guides G, which also project upward and backward at a suitable angle, but not at as great an angle as the standards E. The standards E and the guides G are separated a suitable distance at their upper ends, but they are connected together at suitable intervals by braces H.

From the upper ends of the guides G extend the curved grooved tracks or ways I, which are connected at their upper ends to the tops of the standards E. In the tops of the standards D and in these curved guides or ways are placed suitable pulleys, J K, over which the hoisting-ropes L pass. The upper ends of these ropes are fastened at the upper ends of the tracks, or at any suitable points, and then pass down under the rollers N upon the hay stacker or fork O, then up over the pulleys upon the tops of the standards D, down around the pulleys Q, and thence forward over the cross-piece B, which unites the runners A together, and thence to the singletree to which the hoisting animal or animals are attached.

The hay-carriage O consists of two crosspieces, R, which are united together both by the teeth S and the two pulley-frames T. In the front ends of this frame T are journaled the rollers N, which travel upon the guides G, and in their rear ends the rollers U, which travel upon the rear sides of the inclined standards E. These roller-frames are placed at an angle, as shown, so that the weight of the hay upon the carriage will cause the rollers to bear upon the parts G E, and thus enable the stacking device or fork to be raised with the least possible friction. When the stacking device or fork is lowered so as to rest upon the ground, the hay can be drawn upon it by means of the hay-rake or piled upon it from any other source. When the draft animal or animals are started forward, the carriage is raised upward, assuming a horizontal position, until it reaches the curved guides at the top of the frame-work, when the teeth of the carriage begin to more rapidly assume a vertical position. When the carriage is raised to its highest position, the rollers N strike against the shoulders V upon the standards E, and thus prevent the carriage from moving any farther forward. The rollers in the rear ends of the roller-frames may catch in the crotch which is formed by the union of the standards D and E, and thus check any further upward movement of the carriage. When the carriage is bearing against the shoulders V, the teeth R are in a vertical position, and the hay is thrown off from them upon the stack which is being formed. As soon as the draft-ropes are slackened the carriage sinks downward from its own gravity, ready to be again loaded. The upper ends of the standards D are united together by the cross-piece W, to the ends of which are fastened the stay-ropes X, which brace the frame rigidly in position.

Having thus described my invention, I claim—

1. In a hay-stacker, the combination of the runners or sills A, the standards D E, placed at a suitable angle to each other, the guides G, placed at an angle to the standards E, the curved guides connected to the upper ends of the guides, the hoisting-ropes, the hay-carriage, and the guiding-pulleys, substantially as shown.

2. The combination of the hay-carriage provided with the pulley-frames and pulleys, the standards placed at an angle to each other, the guides placed at an angle to the standards, curved guides or ways, the pulleys at the top of the frame, hoisting-ropes, and the stops or shoulders, substantially as described.

In testimony whereof I affix my signature in presence of two witnesses.

WM. T. KING.

Witnesses:
 M. NEWBY,
 EDWIN HOUGH.